US006003018A

United States Patent [19]
Michaud et al.

[11] Patent Number: 6,003,018
[45] Date of Patent: Dec. 14, 1999

[54] PORTFOLIO OPTIMIZATION BY MEANS OF RESAMPLED EFFICIENT FRONTIERS

[75] Inventors: Richard O. Michaud; Robert Michaud, both of Boston, Mass.

[73] Assignee: Michaud Partners LLP, Boston, Mass.

[21] Appl. No.: 09/149,912

[22] Filed: Sep. 9, 1998

Related U.S. Application Data

[60] Provisional application No. 60/079,702, Mar. 27, 1998.

[51] Int. Cl.[6] .................................................. G06F 17/60
[52] U.S. Cl. ............................................................ 705/36
[58] Field of Search ................................. 705/1, 30, 35, 705/36, 38

[56] References Cited

U.S. PATENT DOCUMENTS

| 5,126,936 | 6/1992 | Champion et al. ...................... 364/408 |
| 5,148,365 | 9/1992 | Dembo ..................................... 705/36 |
| 5,729,700 | 3/1998 | Melnikoff ............................... 395/236 |

(List continued on next page.)

FOREIGN PATENT DOCUMENTS

| WO97/ 22071A1 | 6/1997 | WIPO . |

OTHER PUBLICATIONS

"Estimation for Markowitz Efficient Portfolios," J.Jobson and B.Korkie, Journal of Portfolio Management, Sep. 1980.
"Efficient Asset Management," Richard O. Michaud, Harvard Business School Press, Jun. 1998.
"The Markowitz Optimization Enigma: Is 'Optimized' Optimal?", Financial Analysts Journal, Feb. 1989.
J. Jobson and B. Korkie, "Estimation for Markowitz Efficient Portfolios," Journal of Portfolio Management, Jan. 1, 1981.
Robert Almgren et al., "Optimal Liquidation," http://fin-math.uchicago.edu/~almgren/optliq/optliq.pdf, Jan. 14, 1998.
"The Efficient Frontier," http://www.datachimp.com/article/risk/efficient_frontier.htm, Jan. 14, 1998.
"Risk Efficiency Criteria," http://kierkegaard.ifas.ufl.edu/chuck/aeb6182.risk/Lectur14/sld007.htm, Nov. 5, 1996.
Bey et al., "Measurement of Estimation Risk in Markowitz Portfolios," Draft Working Paper, University of Tulsa, Oct., 1990.
DiBartolomeo, "Estimation Error in Asset Allocation", May 30, 1991.
Broadie, "Computing efficient frontiers using estimated parameters", *Annals of Operations Research* 45 (1993)21–58.
Gold, "Why the Efficient Frontier for Real Estate is "Fuzzy"", *The Journal of Real Estate Portfolio Management*, vol. 1, No. 1, 1995.
DiBartolomeo, "Controlling Estimation Risk to Ensure Reliable Results", Northfield Information Services, Inc.
DiBartolomeo, "Risk of Equity Securities and Portfolios", *Equity Specialization Program*, Readings Pilot Program 1997, vol. 2, III. Risk, Northfield Information Services, Inc., Feb. 22, 1997.
Michaud, Efficient Asset Management, *A Practical Guide to Stock Portfolio Optimization and Asset Allocation*, 1998.
Jobson an Korkie, "Estimation for Markowitz Efficient Portfolios", Journal of the American Statistical Association, Sep. 1980, vol. 75, No. 371.
Michaud, "The Markowitz Optimization Enigma: Is 'Optimized' Optimal?", Financial Analysts Journal, Jan./Feb. 1989.

*Primary Examiner*—Eric W. Stamber
*Assistant Examiner*—John Campa
*Attorney, Agent, or Firm*—Bromberg & Sunstein LLP

[57] ABSTRACT

A method for evaluating an existing or putative portfolio having a plurality of assets. A mean-variance efficient portfolio is computed for a plurality of simulations of input data statistically consistent with an expected return and expected standard deviation of return, and each such portfolio is associated, by means of an index, with a specified portfolio on the mean variance efficient frontier. A statistical mean of the index-associated mean-variance efficient portfolios is used for evaluating a portfolio for consistency with a specified risk objective.

6 Claims, 6 Drawing Sheets

U.S. PATENT DOCUMENTS

| | | | |
|---|---|---|---|
| 5,761,442 | 6/1998 | Barr et al. | 705/36 |
| 5,799,287 | 8/1998 | Dembo | 705/36 |
| 5,812,987 | 9/1998 | Luskin et al. | 705/36 |
| 5,812,988 | 9/1998 | Sandretto | 705/36 |
| 5,819,238 | 10/1998 | Fernholz | 705/36 |
| 5,884,287 | 3/1999 | Edesess | 705/36 |

PORTFOLIO OPTIMIZATION BY MEANS OF RESAMPLED EFFICIENT FRONTIERS

The present application claims priority from U.S. provisional application number 60/079,702, filed Mar. 27, 1998, which is herein incorporated by reference.

TECHNICAL FIELD

The present invention relates to a method for selecting a portfolio of tangible or intangible assets subject to optimization criteria yielding an enhanced mean-variance efficiency.

BACKGROUND OF THE INVENTION

Managers of assets, such as portfolios of stocks, projects in a firm, or other assets, typically seek to maximize the expected or average return on an overall investment of funds for a given level of risk as defined in terms of variance of return, either historically or as adjusted using techniques known to persons skilled in portfolio management. Alternatively, investment goals may be directed toward residual return with respect to a benchmark as a function of residual return variance. Consequently, the terms "return" and "variance," as used in this description and in any appended claims, may encompass, equally, the residual components as understood in the art. The capital asset pricing model of Sharpe and Lintner and the arbitrage pricing theory of Ross are examples of asset evaluation theories used in computing residual returns in the field of equity pricing. Alternatively, the goal of a portfolio management strategy may be cast as the minimization of risk for a given level of expected return.

The risk assigned to a portfolio is typically expressed in terms of its variance $\sigma_P^2$ stated in terms of the weighted variances of the individual assets, as:

$$\sigma_P^2 = \sum_i \sum_j w_i w_j \sigma_{ij},$$

where $w_i$ is the relative weight of the i-th asset within the portfolio, $$\sigma_{ij} = \sigma_i \sigma_j \rho_{ij}$$

is the covariance of the i-th and j-th assets, $\rho_{ij}$ is their correlation, and $\sigma_i$ is the standard deviation of the i-th asset. The portfolio standard deviation is the square root of the variance of the portfolio.

Following the classical paradigm due to Markowitz, a portfolio may be optimized, with the goal of deriving the peak average return for a given level of risk and any specified set of constraints, in order to derive a so-called "mean-variance (MV) efficient" portfolio using known techniques of linear or quadratic programming as appropriate. Techniques for incorporating multiperiod investment horizons are also known in the art. As shown in FIG. 1A, the expected return $\mu$ for a portfolio may be plotted versus the portfolio standard deviation $\sigma$, with the locus of MV efficient portfolios as a function of portfolio standard deviation referred to as the "MV efficient frontier," and designated by the numeral 10. Mathematical algorithms for deriving the MV efficient frontier are known in the art.

Referring to FIG. 1B, a variation of classical Markowitz MV efficiency often used is benchmark optimization. In this case, the expected residual return $\alpha$ relative to a specified benchmark is considered as a function of residual return variance $\omega$, defined as was the portfolio standard deviation $\sigma$ but with respect to a residual risk. An investor with portfolio A desires to optimize expected residual return at the same level $\omega_A$ of residual risk. As before, an efficient frontier 10 is defined as the locus of all portfolios having a maximum expected residual return $\alpha$ of each of all possible levels of portfolio residual risk.

Known deficiencies of MV optimization as a practical tool for investment management include the instability and ambiguity of solutions. It is known that MV optimization may give rise to solutions which are both unstable with respect to small changes (within the uncertainties of the input parameters) and often non-intuitive and thus of little investment sense or value for investment purposes and with poor out-of-sample average performance. These deficiencies are known to arise due to the propensity of MV optimization as "estimation-error maximizers," as discussed in R. Michaud, "The Markowitz Optimization Enigma: Is Optimized Optimal?" *Financial Analysts Journal* (1989), which is herein incorporated by reference. In particular, MV optimization tends to overweight those assets having large statistical estimation errors associated with large estimated returns, small variances, and negative correlations, often resulting in poor ex-post performance.

SUMMARY OF THE INVENTION

In accordance with one aspect of the invention, in one of its embodiments, there is provided a method for evaluating an existing or putative portfolio having a plurality of assets. The existing portfolio is of the kind having a total portfolio value, where each asset has a value forming a fraction of the total portfolio value, each asset has a defined expected return and a defined standard deviation of return, and each asset has a covariance with respect to each of every other asset of the plurality of assets. The method has the steps of:

a. computing a mean-variance efficient frontier based at least on input data characterizing the defined expected return and the defined standard deviation of return of each of the plurality of assets;

b. indexing a set of portfolios located on the mean variance efficient frontier;

c. resampling a plurality of simulations of input data statistically consistent with the defined expected return and the defined standard deviation of return of each of the plurality of assets;

d. computing a simulated mean-variance efficient portfolio for each of the plurality of simulations of input data;

e. associating each simulated mean-variance efficient portfolio with a specified portfolio of the set of indexed portfolios for creating a set of identical-index-associated mean-variance efficient portfolios;

f. establishing a statistical mean for each set of identical-index-associated mean-variance efficient portfolios, the plurality of statistical means defining the resampled efficient frontier; and g. comparing the existing portfolio with a portfolio from the resampled efficient frontier characterized by a specified risk objective.

In accordance with an alternate embodiment of the present invention, an index-associated resampled fuzzy region may be identified in the risk/return plane corresponding to portfolios having a norm, with respect to a corresponding portfolio on the resampled efficient frontier, that is less than or equal to a value corresponding to a specified confidence level. A current portfolio may be assessed with respect to required optimization based at least on the value of the norm of the current portfolio relative to the index-associated resampled fuzzy region.

BRIEF DESCRIPTION OF THE DRAWINGS

The invention will be more readily understood by reference to the following description, taken with the accompanying drawings, in which.

DETAILED DESCRIPTION OF PREFERRED EMBODIMENTS

The foregoing features of the invention will be more readily understood by reference to the following detailed description taken with the accompanying drawings.

In accordance with various embodiments of the present invention, it is recognized that MV optimization is a statistical procedure, based on estimated returns subject to a statistical variance, and that, consequently, the MV efficient frontier, as defined above, is itself characterized by a variance. For a given set of input data characterizing the universe of assets to be considered to comprise a portfolio, and for a given set of constraints on the makeup of the portfolio, an MV efficient frontier may be calculated, using standard techniques discussed above. Since the input data are of a statistical nature (i.e., characterized by means with associated variances and other statistical measures), the input data may be resampled, by simulation of optimization input parameters in a manner statistically consistent with the first set of data, as described, for example, by J. Jobson and B. Korkie, "Estimation for Markowitz Efficient Portfolios," *Journal of Portfolio Management*, (1981), which is herein incorporated by reference. Other resampling methods are within the scope of the invention as described herein, and as claimed in any appended claims.

Figure 1A:
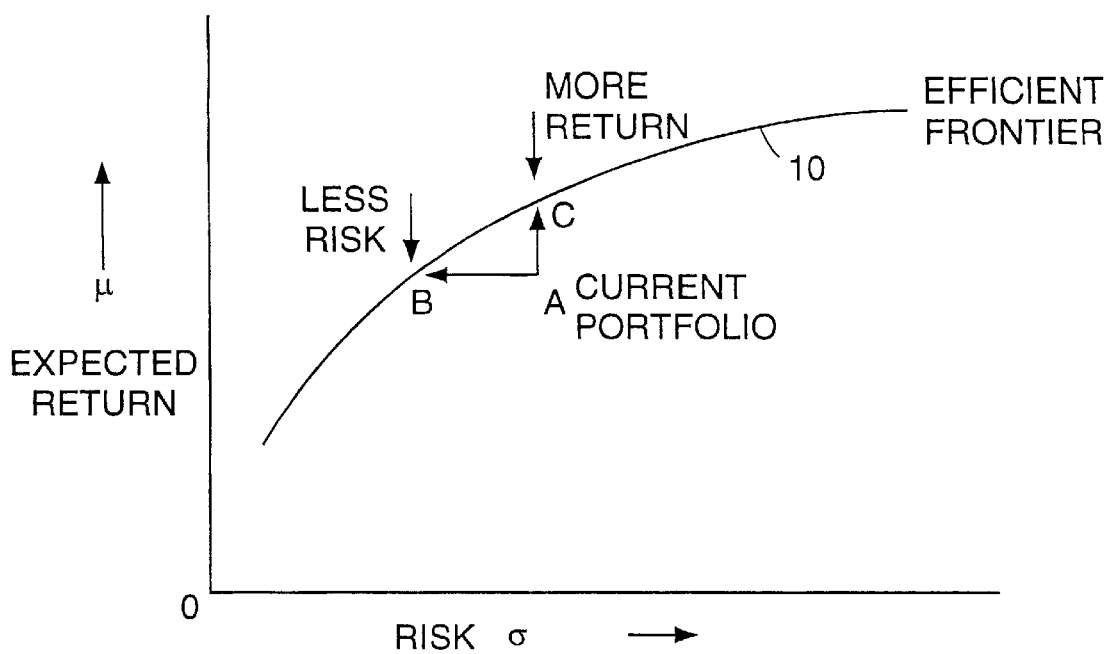
FIG. 1A depicts the prior art principle of calculating an efficient frontier of maximum expected return for each given level of portfolio risk.
Figure 1B:
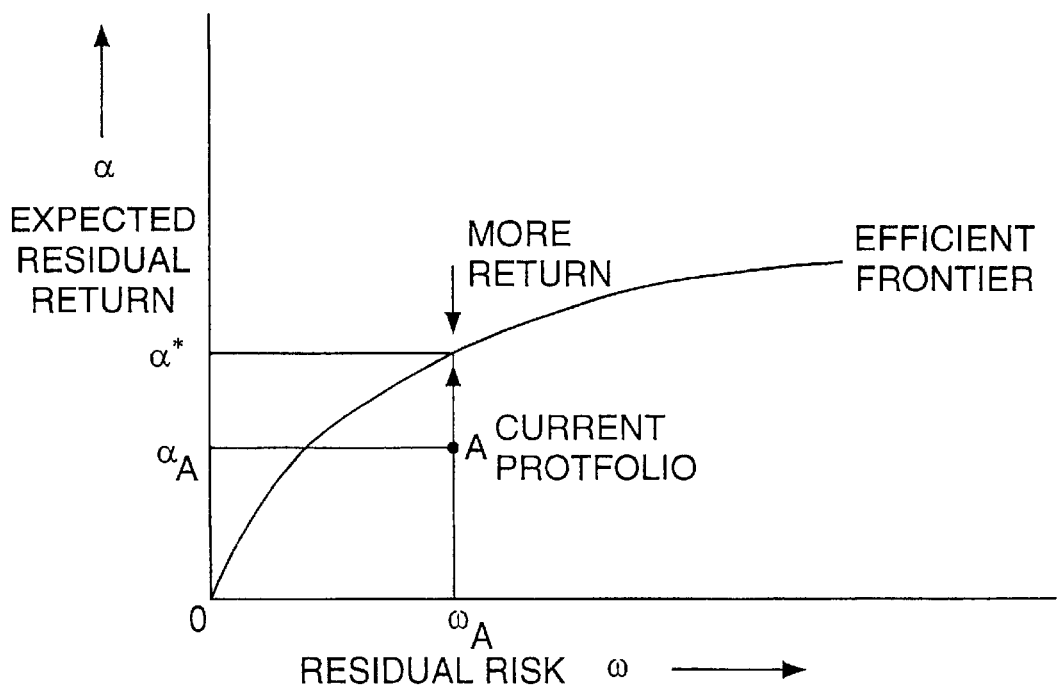
FIG. 1B depicts the prior art principle of calculating an efficient frontier of maximum expected residual return for each given level of portfolio residual risk.
Figure 2:
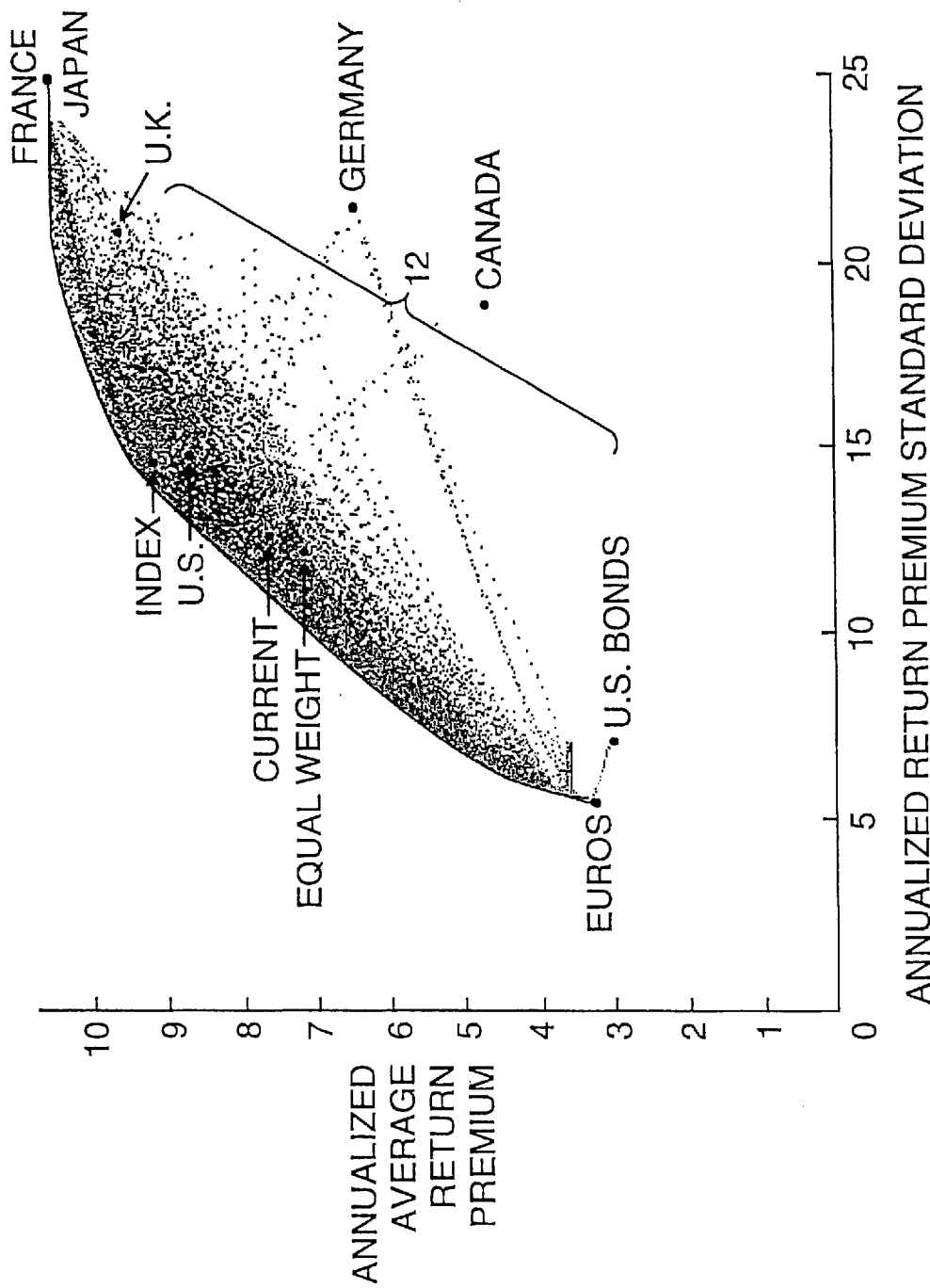
FIG. 2 displays a set of statistically equivalent portfolios within the risk/return plane.
Figure 3:
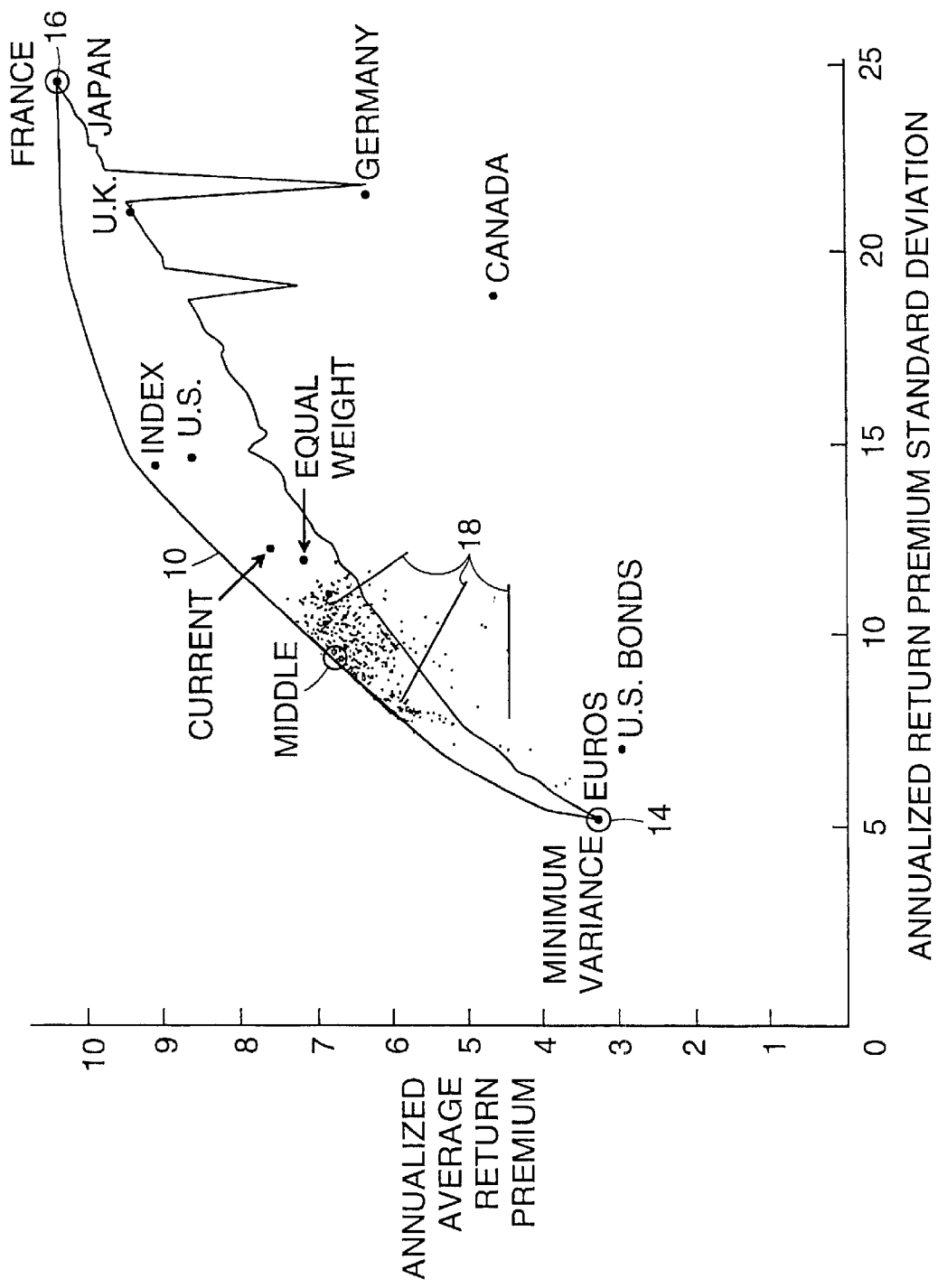
FIG. 3 displays statistically equivalent portfolios within the risk/return plane corresponding to three particular risk rankings on the efficient frontier: minimum variance, maximum return, and a middle return portfolio.

Based on the resampled data, the MV efficient portfolios may be recalculated, subject to the same constraints as applied in the initial solution. In this manner, as shown in FIG. 2, a set 12 of statistically equivalent MV efficient portfolios may be calculated. By iterating this procedure, a large MV efficient "statistical equivalence" set of portfolios, in the expected return—portfolio variance space, may be generated. In particular—an existing portfolio may be found to be consistent, in a statistical sense, with MV efficiency and thus not to require optimization, thereby potentially and advantageously saving transaction costs associated with revision of a portfolio. Referring to FIG. 3, statistically equivalent portfolios within the risk/return plane are shown corresponding to three particular risk rankings on the efficient frontier: namely, minimum variance 14, maximum return 16, and a middle return portfolios 18.

Figure 4:
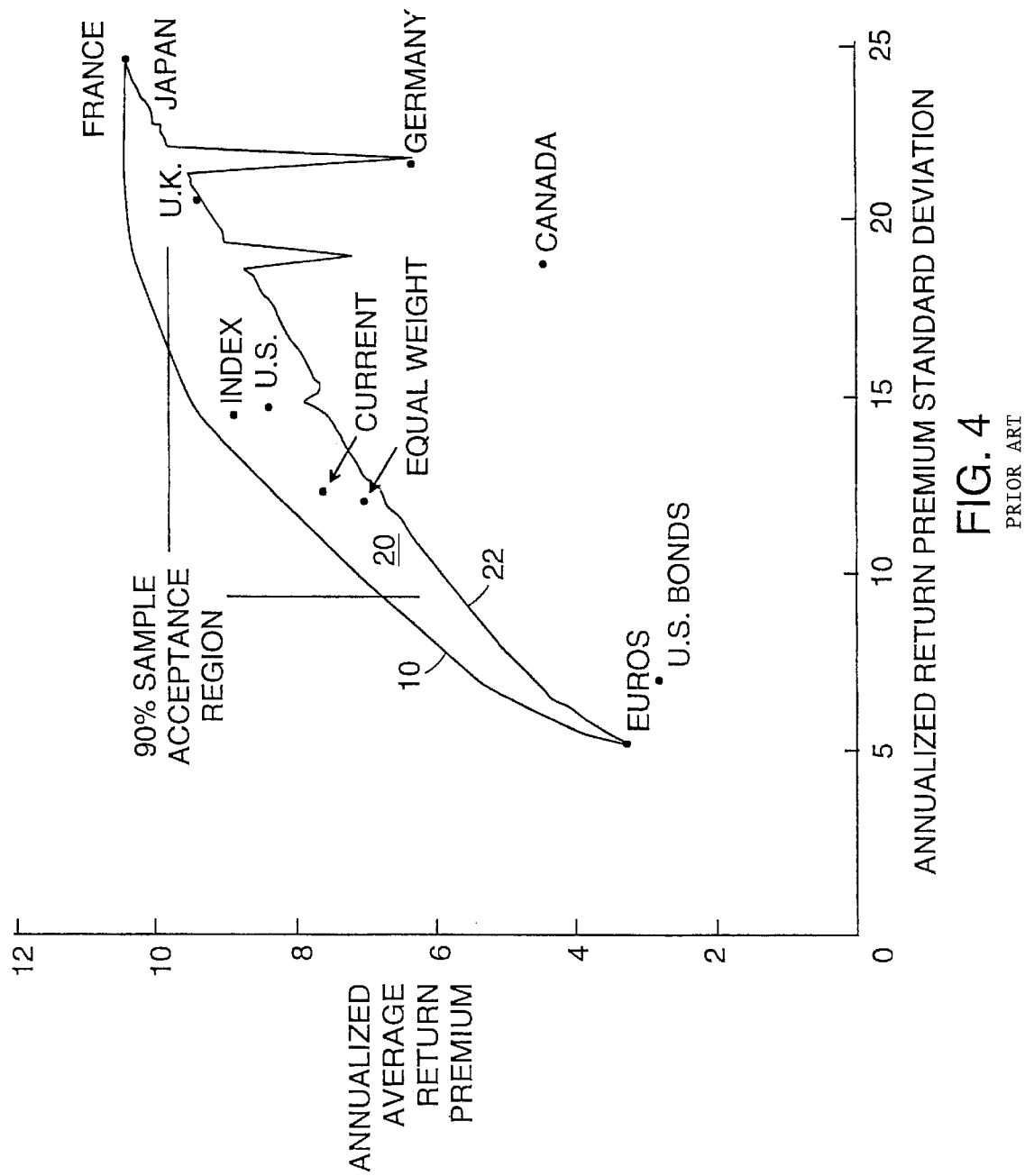
FIG. 4 displays a region within the risk/return plane corresponding to statistically equivalent portfolios for a given level of probability.

One method of establishing statistical equivalence is described in reference to FIG. 4. In accordance with one sample acceptance procedure, a sample acceptance area 20 is defined under efficient frontier 10. The 100(1−α) % sample acceptance region 20 includes, on average, the fraction 1−α of Monte-Carlo estimated resampled portfolios, where α is the probability of a Type I error, i.e., the probability of rejecting the null hypothesis when it is true, which are statistically equivalent to a portfolio denoted as CURRENT. The loci corresponding, in the risk/return plane, to particular assets included within the universe from which the sample portfolio is drawn are indicated in the figure. Thus, for α=0.1, the 90% sample acceptance region 20 is obtained. Sample acceptance region 20 may be obtained, in practice, by a procedure in which the area under efficient frontier 10 is divided into mutually exclusive column (or row) rectangles that include all the simulated portfolios. The base of the rectangle is defined as the minimum return point that contains the fraction 1−α of the simulated portfolios within the rectangle. The midpoints of the rectangles are connected to obtain curve 22 which constitutes the lower boundary of sample acceptance area 20. Irregularities in the shape of curve 22 are attributable in part to the small number of assets included in the example.

A disadvantage of the foregoing method is that all portfolios which are statistically equivalent (in terms of the specified criterion) appear within sample acceptance region 20 without accounting for desired risk objectives or other constraints. Referring now to FIG. 3, a method is described whereby, in accordance with a preferred embodiment of the present invention, all resampled portfolios within the risk/return plane may be associated, many-to-one, with particular portfolios on MV efficient frontier 10. Various criteria may be applied in associating portfolios with those on the MV efficient frontier, and all such associations are within the scope of the present invention. As one example, each efficient frontier portfolio (i.e., each point on efficient frontier 10) may be identified by its relative return rank. Similarly, the efficient frontier portfolios may be ranked by their variance, the maximum variance corresponding to the maximum return, the rankings by risk or return similarly mapping onto one another uniquely. Thus, for example, the minimum variance portfolio 14 might have the lowest rank relative to the other efficient portfolios of efficiency frontier 10. Similarly, maximum average return portfolio 16 has the highest average return rank in each simulated efficient frontier. Similarly, any other simulated portfolio is rank associated with a particular efficient frontier portfolio. The sparsely clustered portfolios 18 shown in the figure correspond to the 'middle' ranked efficient portfolio. In practice, the shape of the rank-associated regions varies in dependence upon the position of the portfolio on the MV efficient frontier.

It is not necessary, however, that the association with efficient frontier portfolios be by rank, and particular portfolios on the MV efficient frontier may be indexed, and thus index-associated, each with a set of statistically equivalent efficient portfolios lying below the efficient frontier.

In accordance with an alternate embodiment of the invention, indexing of the set of MV efficient portfolios for associating the resampled portfolios is to associate with each MV efficient portfolio a "lambda value," defining the risk/return preference, with respect to which the quantity $\phi = \sigma^2 - \lambda \mu$ is minimized, where $\sigma^2$ is the variance of each portfolio and $\mu$ is the expected return of each portfolio of the set of portfolios located on the mean variance efficient frontier. The parameter $\lambda$ assumes a value between zero and infinity.

Figure 5:
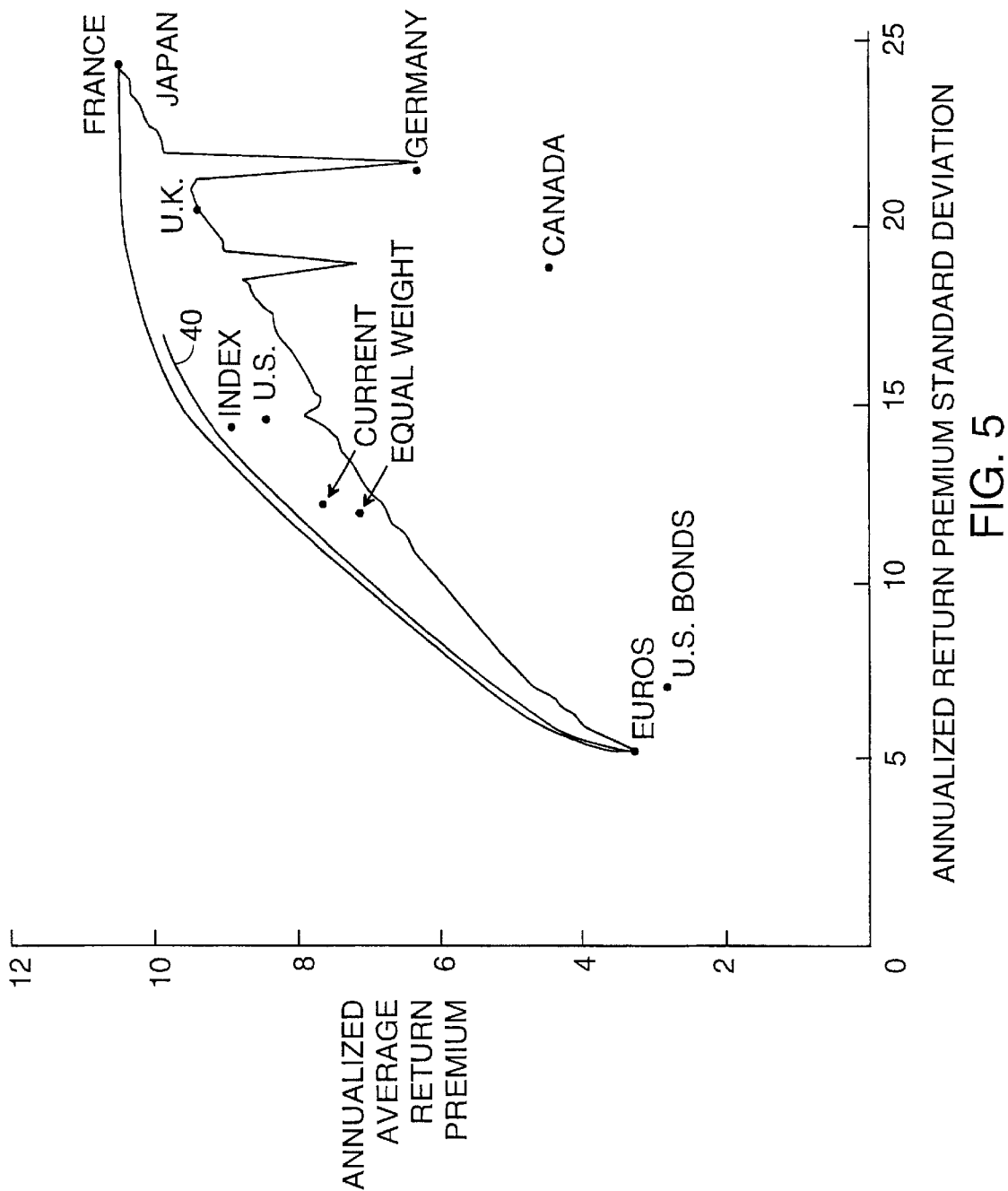
FIG. 5 shows the resampled efficient frontier plotted in the risk/return plane in accordance with a preferred embodiment of the present invention.

Once the ensemble of index-associated MV efficient portfolios has been associated, usual statistical measures of the ensemble may be derived. These measures include, without limitation, the averages, standard errors, and t-statistics of the average of the portfolio weights of the rank-associated simulated efficient portfolios. Referring now to FIG. 5, an average of index-associated MV efficient portfolios may be defined, in accordance with preferred embodiments of the present invention, the average of index-associated MV efficient portfolios being referred to as a "resampled-efficient portfolio." The average may be determined with respect to any of a variety of parameters, and, in accordance with a preferred embodiment, it is with respect to the vector average of the associated portfolios. The locus 40 of resampled-efficient portfolios is referred to as the "resampled efficient frontier." The resampled-efficient portfolio and its associated statistics may be applied as a statistical measure for portfolio analysis, as further described below. Its application, as a choice for portfolio selection, advantageously removes, by definition, the "outlier" portfolios which strongly depend on values of a particular set of inputs and improves out-of-sample performance, on average. Statistical procedures for portfolio analysis and revision, and performance benefits based on these concepts, in accordance with embodiments of the present invention, are also described in detail in the book, R. Michaud, *Efficient Asset Management*, (Harvard Business School Press, 1998), which is hereby incorporated by reference, as are all references cited in the text of the book.

Figure 6:
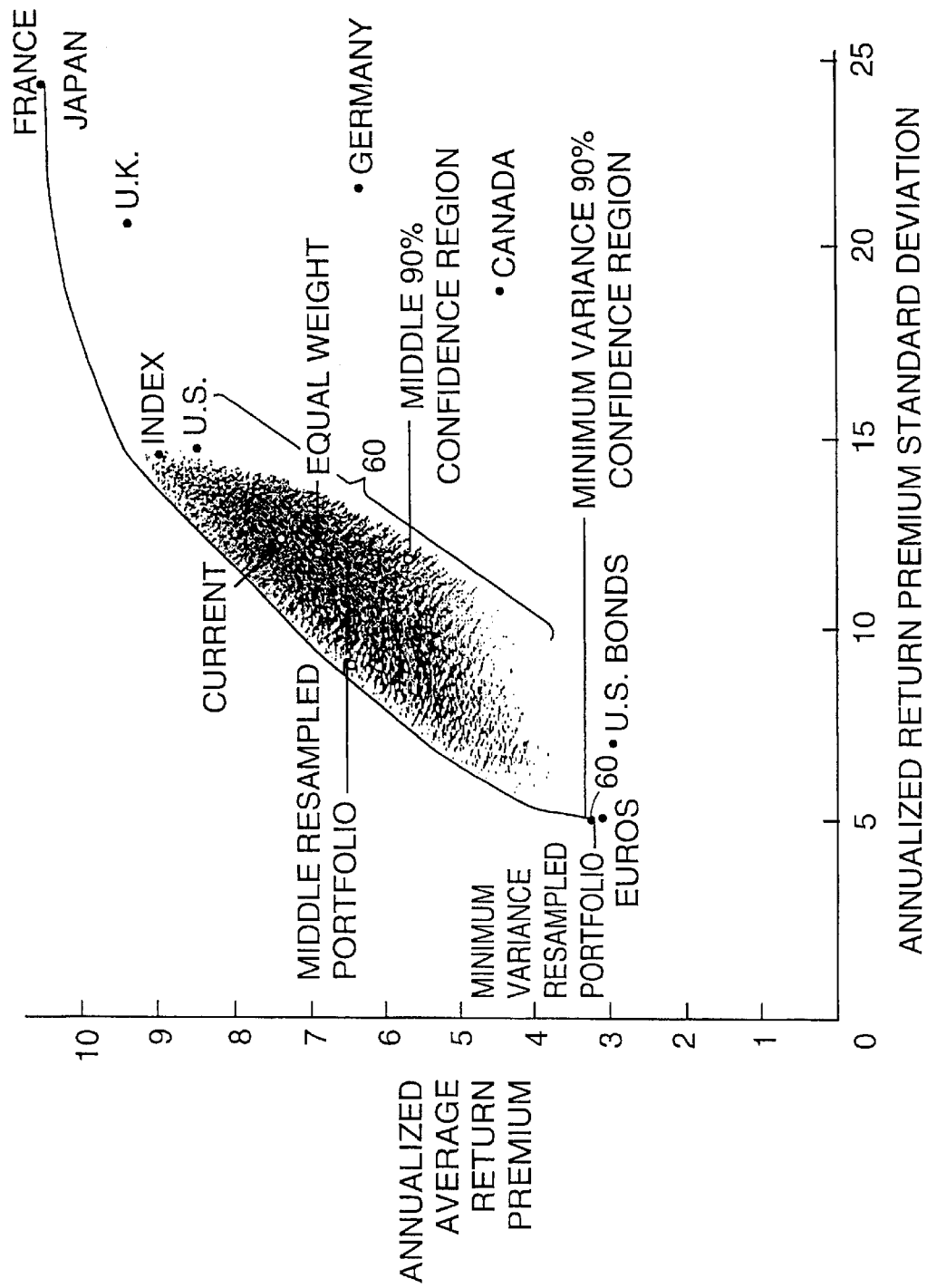
FIG. 6 displays a fuzzy region of statistically equivalent portfolios in the risk/return plane relative to resampled efficiency for two particular risk rankings for a given level of probability: minimum variance and middle return.

In accordance with other embodiments of the invention, the portfolio optimization problem may be cast in terms of fuzzy sets and the application of fuzzy logic. Referring now to FIG. 6, the "similarity" of a particular resampled efficient frontier portfolio (whether risk-indexed or otherwise indexed) to a corresponding resampled efficient portfolio may be defined by a "norm," with the norm having the usual properties of a distance function as known to persons skilled in the mathematical arts. Risk-indexing will be assumed in the following description solely for purposes of coherence of presentation. In a preferred embodiment, the norm may be a Euclidean vector distance, or $L_2$ norm. The distribution of the values of the norms of risk-index associated resampled portfolios relative to the associated resampled efficient frontier portfolio defines the distance criterion and fuzzy or similarity resampled efficient region (again, relative to the associated resampled efficient frontier portfolio) at a given level of probability. A fuzzy region, designated generally by numeral 60, corresponds to the region in the risk/return plane at probability level 0.9 using the Euclidean norm for the minimum variance and middle resampled efficient risk-indexed portfolios, each taken relative to the resampled efficient frontier. In particular, the distance criterion for any portfolio P is taken to be the relative variance for portfolio P, $$(P-P_0)^t * S * (P-P_0),$$

where $P-P_0$ is the difference vector of portfolio weights with respect to $P_0$, the corresponding index-associated portfolio on the resampled efficient frontier, and, S is the input return covariance matrix (with the superscript 't' denoting the transpose of the difference vector). The distance criterion defined for probability level $1-\alpha$ is the value of the norm of the risk-indexed resampled portfolios corresponding to the $100(1-\alpha)$ percentile value of all risk-indexed resampled portfolios sorted from small to large. An example of the use of a confidence region resampling test statistic relative to the resampled efficient frontier is provided at page 73 of Michaud, *Efficient Asset Management*. Portfolios within a risk-indexed resampled fuzzy region at a given level of probability may be said to be sufficiently similar to the risk-indexed resampled efficient portfolio to be considered resampled efficient and not to require optimization. Particular probability levels and $L_p$ norms may be specified as a matter of design choice, within the scope of the present invention.

In an alternative embodiment, the disclosed method for evaluating an existing or putative portfolio may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

The described embodiments of the invention are intended to be merely exemplary and numerous variations and modifications will be apparent to those skilled in the art. All such variations and modifications are intended to be within the scope of the present invention as defined in the appended claims.

We claim:

1. A method for selecting a value of portfolio weight for each of a plurality of assets of an optimal portfolio, the value of portfolio weight chosen from values between zero and unity, each asset having a defined expected return and a defined standard deviation of return, each asset having a covariance with respect to each of every other asset of the plurality of assets, the method comprising:

a. computing a mean-variance efficient frontier based at least on input data characterizing the defined expected return and the defined standard deviation of return of each of the plurality of assets;

b. indexing a set of portfolios located on the mean-variance efficient frontier thereby creating an indexed set of portfolios;

c. resampling a plurality of simulations of input data statistically consistent with the defined expected return and the defined standard deviation of return of each of the plurality of assets;

d. computing a simulated mean-variance efficient portfolio for each of the plurality of simulations of input data;

e. associating each simulated mean-variance efficient portfolio with a specified portfolio of the indexed set of portfolios for creating a set of identical-index-associated mean-variance efficient portfolios;

f. establishing a statistical mean for each set of identical-index-associated mean-variance efficient portfolios, thereby generating a plurality of statistical means, the plurality of statistical means defining a resampled efficient frontier;

g. selecting a portfolio weight for each asset from the resampled efficient frontier according to a specified risk objective; and h. investing funds in accordance with the selected portfolio weights.

2. A method according to claim 1, wherein the step of indexing the set of portfolios includes associating a rank with each portfolio of the indexed set of portfolios located on the mean-variance efficient frontier.

3. A method according to claim 1, wherein the step of indexing the set of portfolios includes associating a lambda value for which $\phi = \sigma^2 - \lambda \mu$ is minimized, where $\sigma^2$ is the variance of each portfolio and $\mu$ is the defined expected return of each portfolio of the set of portfolios located on the mean-variance efficient frontier.

4. A method for investing funds based on an evaluation of an existing portfolio having a plurality of assets, the existing portfolio having a total portfolio value, each asset having a value forming a fraction of the total portfolio value, each asset having a defined expected return and a defined standard deviation of return, each asset having a covariance with respect to each of every other asset of the plurality of assets, the method comprising:

a. computing a mean-variance efficient frontier having a plurality of portfolios of assets based at least on input data characterizing the defined expected return and the defined standard deviation of return of each of the plurality of assets;

b. associating an index with each portfolio of assets of the mean-variance efficient frontier in such a manner as to create a set of indexed portfolios;

c. resampling a plurality of simulations of input data statistically consistent with the defined expected return and the defined standard deviation of return of each of the plurality of assets;

d. computing a mean-variance efficient portfolio for each of the plurality of simulations of input data;

e. associating each simulated mean-variance efficient portfolio with a specified portfolio of the set of indexed portfolios for creating a set of identical-index-associated mean-variance efficient portfolios;

f. establishing a statistical mean for each set of identical-index-associated mean-variance efficient portfolios, the plurality of statistical means defining a resampled efficient frontier;

g. comparing the existing portfolio with a portfolio from the resampled efficient frontier characterized by a specified risk objective for determining a preferred portfolio; and h. investing funds in accordance with the preferred portfolio.

5. A method for investing funds based on evaluation of an existing portfolio having a plurality of assets, the existing portfolio having a total portfolio value, each asset having a value forming a fraction of the total portfolio value, each asset having a defined expected return and a defined standard deviation of return, each asset having a covariance with respect to each of every other asset of the plurality of assets, the method comprising:

a. computing a mean-variance efficient frontier based at least on input data characterizing the defined expected return and the defined standard deviation of return of each of the plurality of assets;

b. associating an index with each portfolio of assets associated with the mean-variance efficient frontier in such a manner as to create a set of indexed portfolios;

c. resampling a plurality of simulations of input data statistically consistent with the defined expected return and the defined standard deviation of return of each of the plurality of assets;

d. computing a simulated mean-variance efficient portfolio for each of the plurality of simulations of input data;

e. associating each simulated mean-variance efficient portfolio with a specified portfolio of the set of indexed portfolios for creating a set of identical-index-associated mean-variance efficient portfolios;

f. establishing a statistical mean for each set of identical-index-associated mean-variance efficient portfolios, the plurality of statistical means defining a resampled efficient frontier;

g. associating a norm having a value characterizing a similarity of each portfolio with respect to a corresponding portfolio on the resampled efficient frontier;

h. defining a index-associated resampled fuzzy region corresponding to portfolios having a norm value less than or equal to a value associated with a specified confidence level;

i. evaluating whether a current portfolio requires optimization based at least on a norm of the current portfolio in comparison with the index-associated resampled fuzzy region for creating an optimized portfolio; and j. investing funds in accordance with the optimized portfolio.

6. A computer program product for use on a computer system for selecting a value of portfolio weight for each of a specified plurality of assets of an optimal portfolio and for enabling investment of funds in the specified plurality of assets, the value of portfolio weight chosen from values between zero and unity, each asset having a defined expected return and a defined standard deviation of return, each asset having a covariance with respect to each of every other asset of the plurality of assets, the computer program product comprising a computer usable medium having computer readable program code thereon, the computer readable program code including:

a. program code for causing a computer to perform the step of computing a mean-variance efficient frontier based at least on input data characterizing the defined expected return and the defined standard deviation of return of each of the plurality of assets;

b. a sequencer for indexing a set of portfolios located on the mean-variance efficient frontier;

c. a routine for causing the computer to resample a plurality of simulations of input data statistically consistent with the defined expected return and the defined standard deviation of return of each of the plurality of assets;

d. program code for causing the computer to compute a mean-variance efficient portfolio for each of the plurality of simulations of input data;

e. program code for causing the computer to associate each simulated mean-variance efficient portfolio with a specified portfolio of the set of indexed portfolios for creating a set of identical-index-associated mean-variance efficient portfolios;

f. a module for causing the computer to establish a statistical mean for each set of identical-index-associated mean-variance efficient portfolios, the plurality of statistical means defining the resampled efficient frontier; and g. program code for causing the computer to select a portfolio weight for each asset from the resampled efficient frontier according to a specified risk objective and for enabling an investor to invest funds in accordance with the selected portfolio weight of each asset.

* * * * *